United States Patent [19]
Yen

[11] Patent Number: 5,560,081
[45] Date of Patent: Oct. 1, 1996

[54] JOINING SLEEVE ASSEMBLY FOR JOINING METAL COOKWARE WITH A COOKWARE HANDLE

[76] Inventor: Jung C. Yen, No. 69-3, Nan Hising Rd., Nan Wan Village, Young Kang, Tainan, Taiwan

[21] Appl. No.: 567,594

[22] Filed: Dec. 5, 1995

[51] Int. Cl.⁶ .................................................. A47J 45/07
[52] U.S. Cl. ............... 16/114 A; 16/110 R; 16/DIG. 24; 99/403; 99/646 R; 220/752; 220/759; 403/6; 403/297
[58] Field of Search .............................. 99/340, 403, 645, 99/646 R; 16/110 R, 110.5, 114 A, 125, DIG. 24, DIG. 25; 29/426.5; 220/752, 759, 743, 758, 912; 294/31.1; 403/322, 328, 6, 272, 273, 282, 297

[56] References Cited

U.S. PATENT DOCUMENTS

| | | | |
|---|---|---|---|
| 3,835,690 | 9/1974 | Leonhardt et al. | 403/297 X |
| 3,878,584 | 4/1975 | Witte | 220/752 X |
| 3,883,169 | 5/1975 | Fischbach | 16/114 X |
| 4,026,435 | 5/1977 | Hendon | 99/403 X |
| 4,083,081 | 4/1978 | Witte | 16/114 A |
| 4,179,146 | 12/1979 | Fischbach | 16/114 A |
| 4,222,493 | 9/1980 | Friedman | 220/8 |
| 4,825,505 | 5/1989 | Witte | 16/114 A |
| 5,313,735 | 5/1994 | Latouche | 16/114 R |
| 5,353,475 | 10/1994 | Fischbach | 29/426.5 X |
| 5,428,868 | 7/1995 | Safdeye et al. | 16/115 |

Primary Examiner—Timothy F. Simone
Attorney, Agent, or Firm—Pro-Techtor International

[57] ABSTRACT

The present invention concerns a joining sleeve assembly for joining a metal cookware with a cookware handle. Principally, when a metal cookware piece is bent to form a hollow joining sleeve assembly, a pair of protruding pieces and a pair of corresponding rectangular through holes are joined together by means of inter-coupling linkages or hook-coupling linkages, which are very secure. As a result, effects, such as configuration flexibility, simple construction, attractive appearance, strong joining strength and long working life, can be achieved.

5 Claims, 10 Drawing Sheets

1

JOINING SLEEVE ASSEMBLY FOR JOINING METAL COOKWARE WITH A COOKWARE HANDLE

BACKGROUND OF THE INVENTION

The present invention concerns a joining sleeve assembly for joining metal cookware with a cookware handle. In principle, the joining sleeve assembly utilizes a simple male-female pairing/latching-together configuration, with which effects, such as attractive appearance and strong joining strength, can be achieved after assembly.

In conventional assemblies, a metal piece with one end being a flat surface and the other end being equipped with a bent flat surface is bent to form a hollow joining sleeve assembly. After bending, the flat surface presses against the bent surface, and these surfaces are joined together by welding. However, this assembly is subject to the following drawbacks:
(a) The assembly is fastened together by means of spot welding, and the resulting welding spots detrimentally affect the appearance of the product.
(b) The flat surface must be pressed against the bend flat surface before welding can proceed, which is time consuming.
(c) The flat surface and bent flat surface are joined by means of spot welding. Since the welding quality has a direct effect on the product's working life, a great deal of effort is required in performing the spot welding operation, which is time consuming and inefficient.

In light of the above-mentioned drawbacks, another assembly was developed. The assembly involves bending a metal piece to form a hollow joining sleeve assembly. The two joining ends of said metal piece are serrated in a dovetail configuration to form a tight interlocking joint, when fitted correspondingly.

However, this assembly is also subject to the following drawbacks:
(a) Since a dovetail joint is involved in joining the two ends, its fabrication must be very precise in order to achieve a tight interlocking joint, which is tedious and time consuming.
(b) Since the two joining ends are joined together by means of flaring tenons and mortises, the resulting strength is not quite adequate. As a result, the working life of the final product is affected adversely.

In light of the above-mentioned problems, the inventor of the present invention conducted studies and improvements and arrived at the present joining sleeve assembly for joining a metal cookware with a cookware handle. In essence, the joining sleeve assembly utilizes a simple male-female pairing/latching-together configuration, with which the following effects can be achieved:
(a) After joining, the joined surface is flat, and the joining points cannot be seen. This imparts to the final product a desirable appearance.
(b) The means of joining involves inter-coupling linkages or hook-coupling linkages, which are very secure. As a result, the final product can have a long working life.
(c) Principally, the joining sleeve assembly utilizes a simple male-female coupling configuration, and the joining operation is simple and can be executed quickly. As a result, the joining method of the present invention is suitable for mass production, and both production cost and time can be reduced.
(d) The joining configuration can be varied by using different dies. Accordingly, flexibility can be achieved without the need to re-design the die set.

2

DESCRIPTION OF THE PREFERRED EMBODIMENTS

Figure 1:
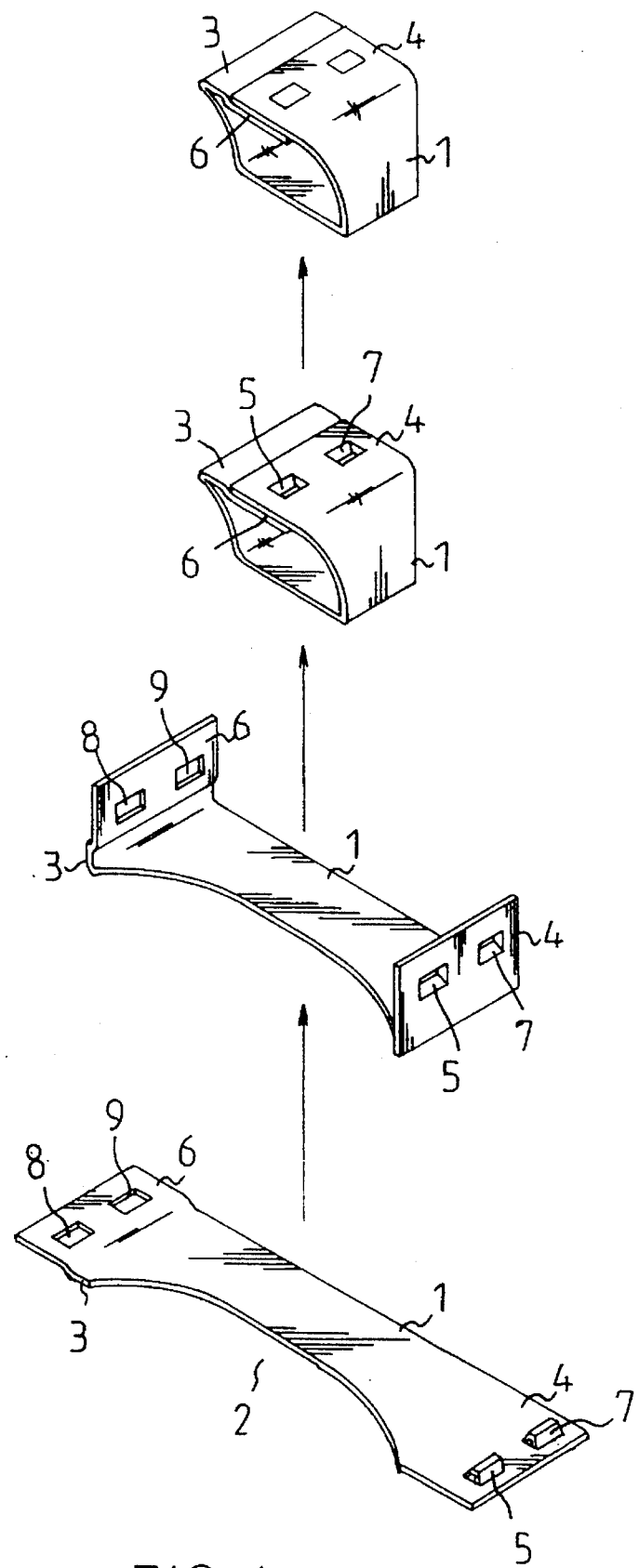
FIG. 1 is a three-dimensional schematic figure showing a joining method of the present invention.
Figure 3:
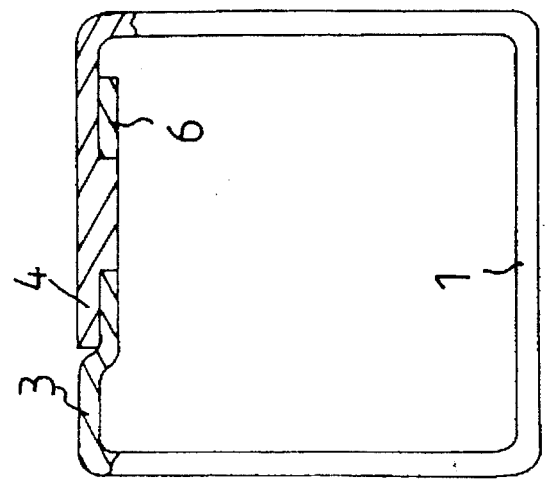
FIG. 3 is a cut-away front view figure showing a completed joint of the present invention.
Figure 2:
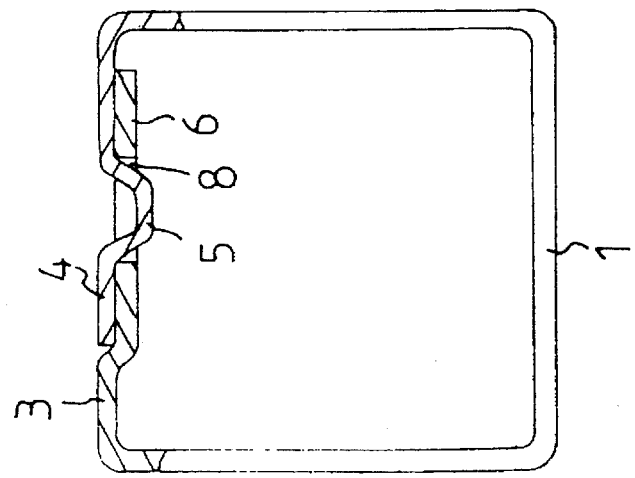
FIG. 2 is a cut-away front view figure indicating a joint of the present invention.
Figure 4:
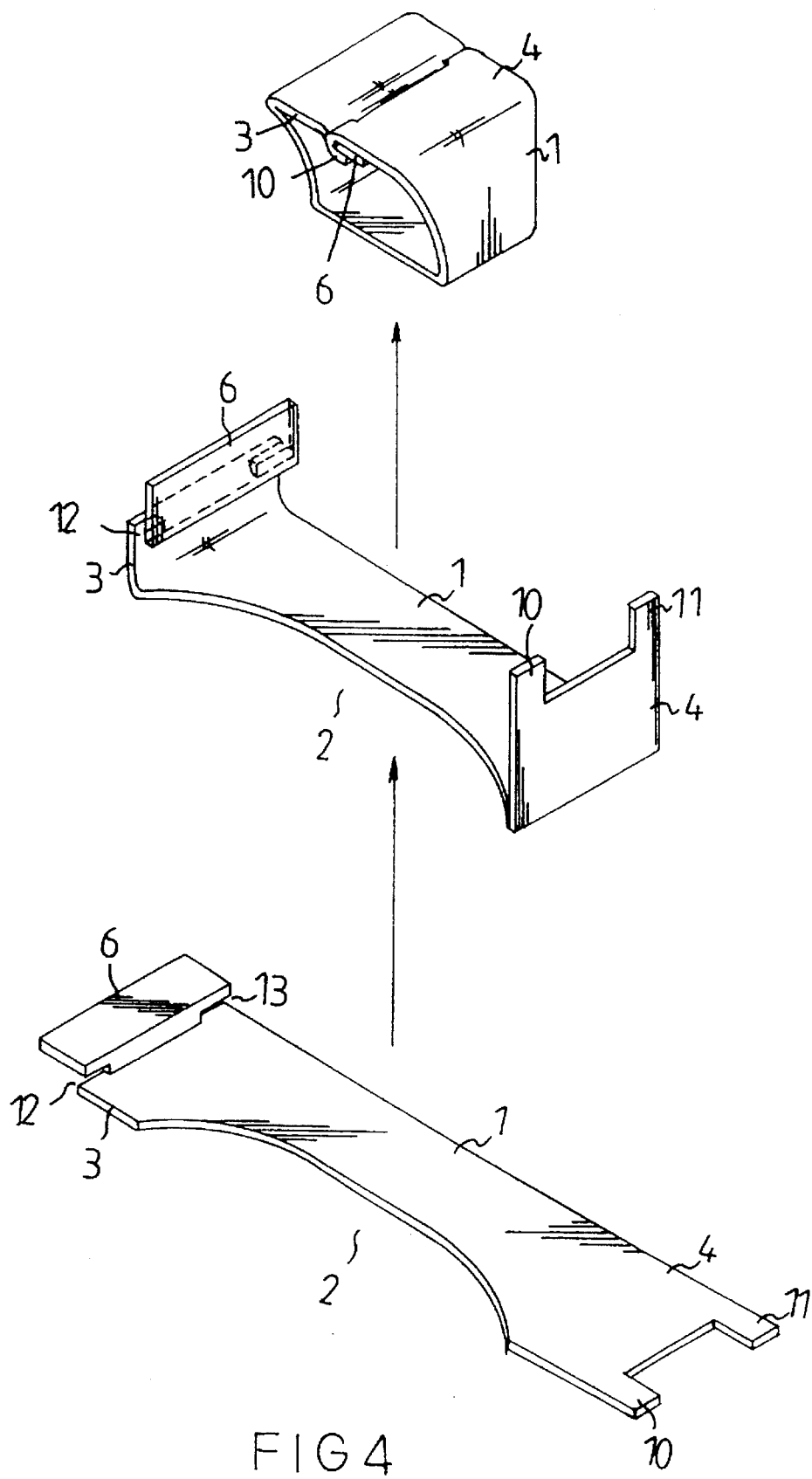
FIG. 4 is a three-dimensional schematic figure showing a second joining method of the present invention.
Figure 5:
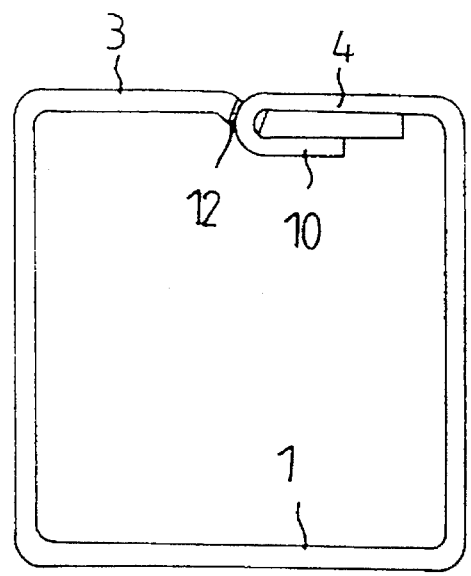
FIG. 5 is a cut-away front view figure indicating a joint pertaining to the second joining method of the present invention.
Figure 6:
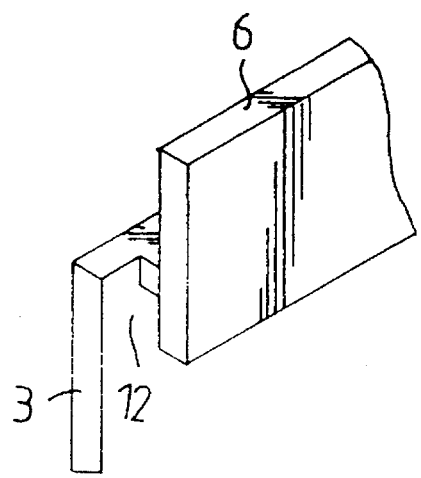
FIG. 6 is a figure showing in detail a component pertaining to the second joining method of the present invention.
Figure 7:
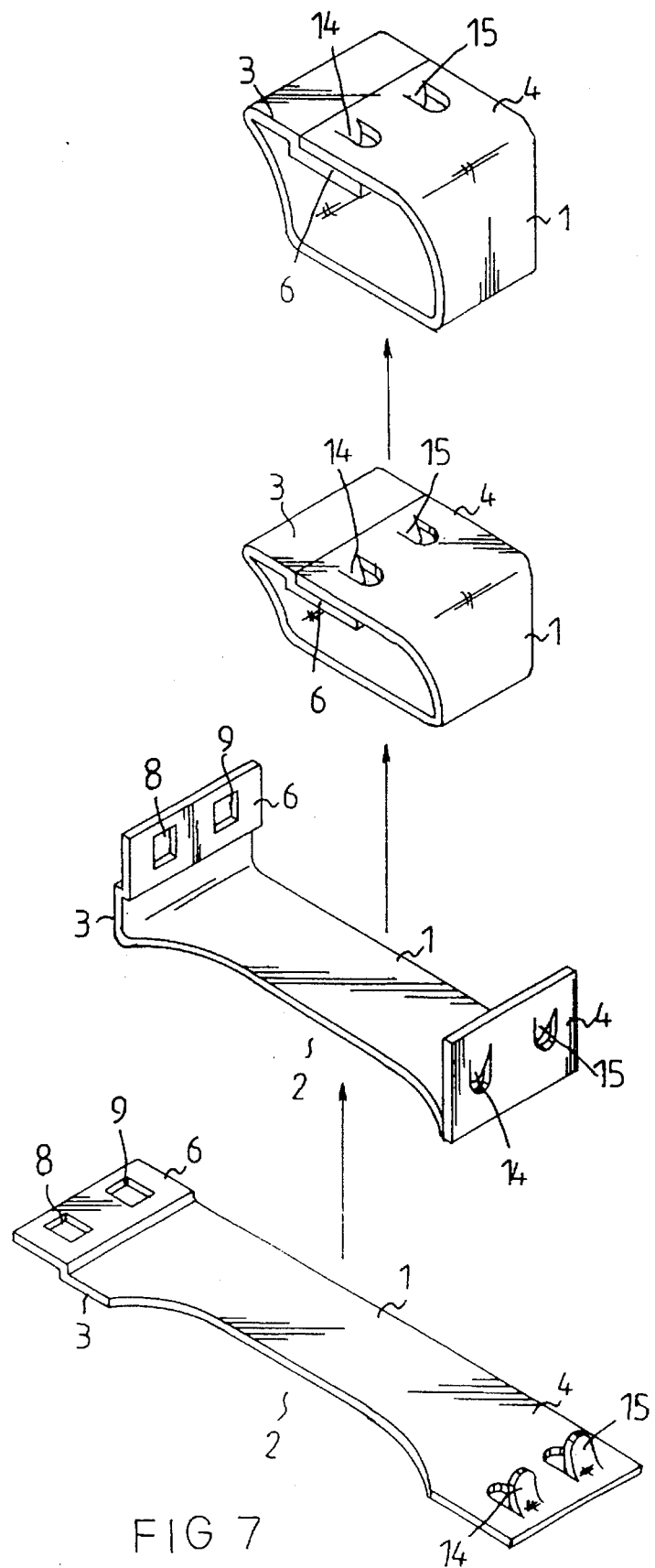
FIG. 7 is a three-dimensional schematic figure showing a third joining method of the present invention.
Figure 10:
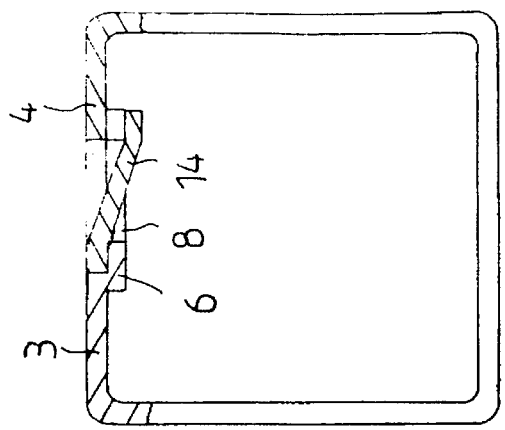
FIG. 10 is a cut-away front view figure showing another completed joint pertaining to the third joining method of the present invention.
Figure 9:
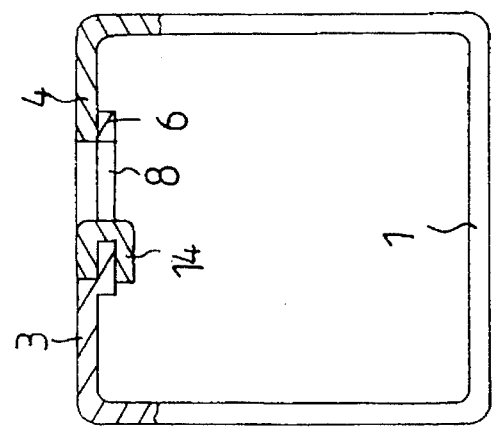
FIG. 9 is a cut-away front view figure showing a completed joint pertaining to the third joining method of the present invention.
Figure 8:
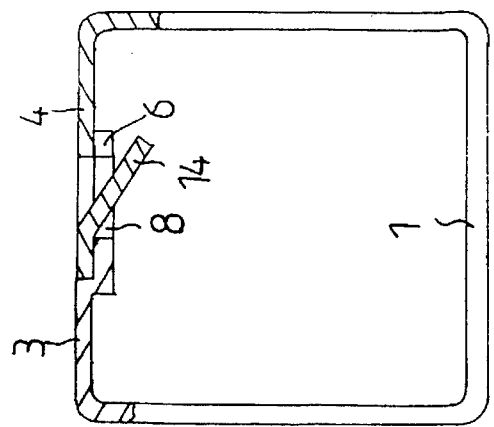
FIG. 8 is a cut-away front view figure indicating a joint pertaining to the third joining method of the present invention.
Figure 11:
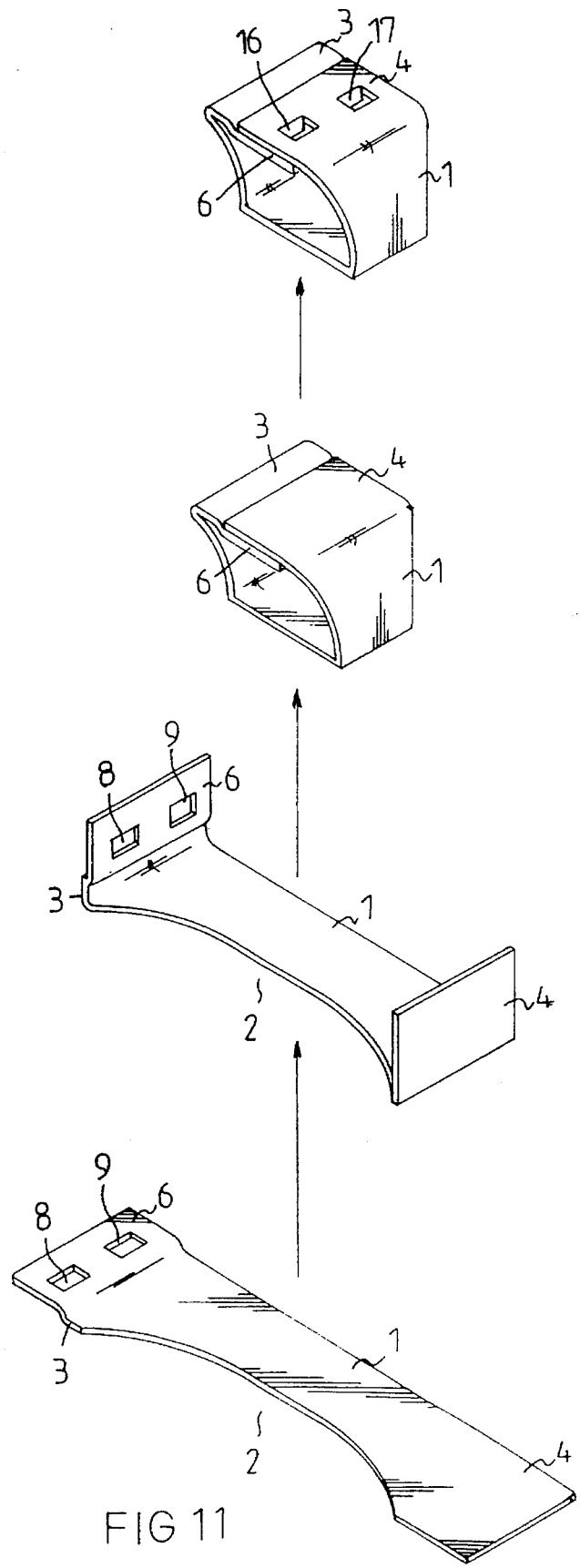
FIG. 11 is a three-dimensional schematic figure showing a fourth joining method of the present invention.
Figure 12:
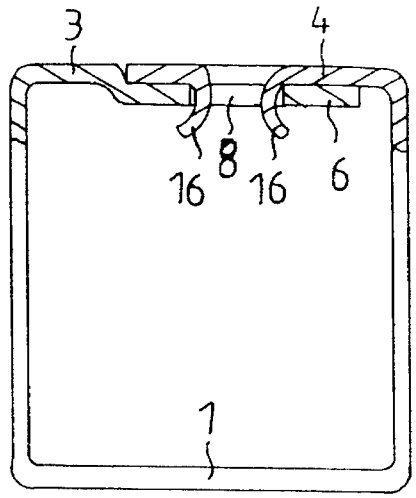
FIG. 12 is a cut-away front view figure showing a joint produced by the fourth joining method of the present invention.
Figure 13:
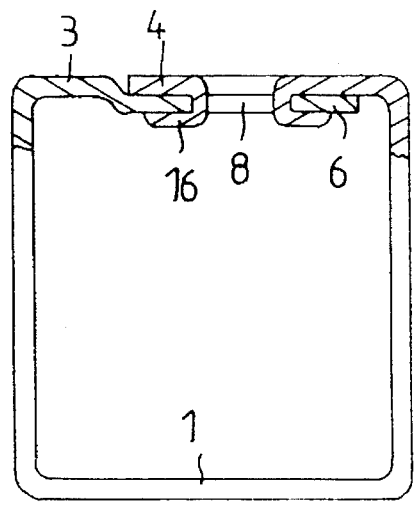
FIG. 13 is a cut-away front view figure showing a completed joint pertaining to the fourth joining method of the present invention.
Figure 14:
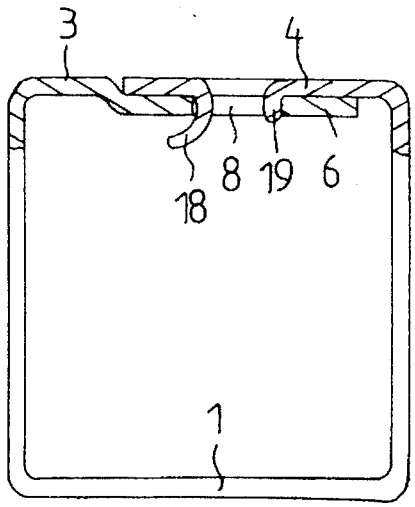
FIG. 14 is a cut-away front view figure showing a joint pertaining to another practical embodiment of the fourth joining method of the present invention.
Figure 15:
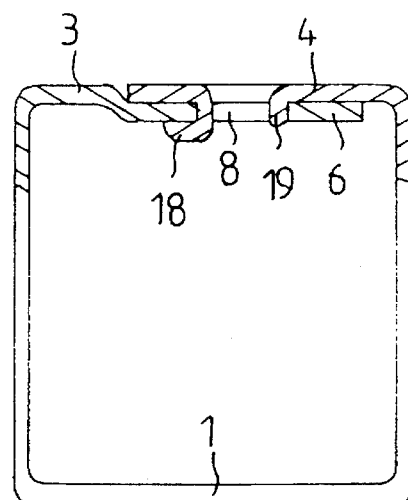
FIG. 15 is a cut-away front view figure showing a completed joint pertaining to another practical example of the fourth joining method of the present invention.
Figure 16:
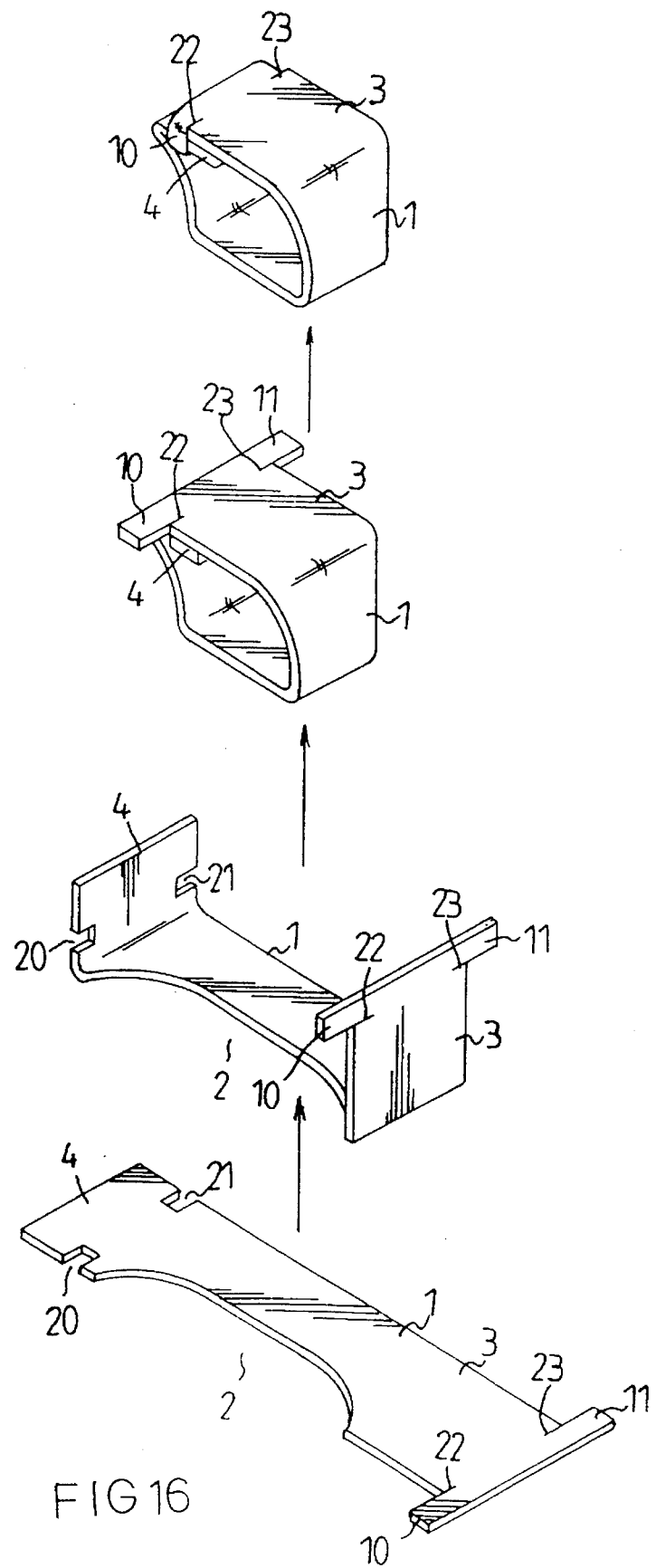
FIG. 16 is a three-dimensional schematic figure showing a fifth joining method of the present invention.
Figure 17:
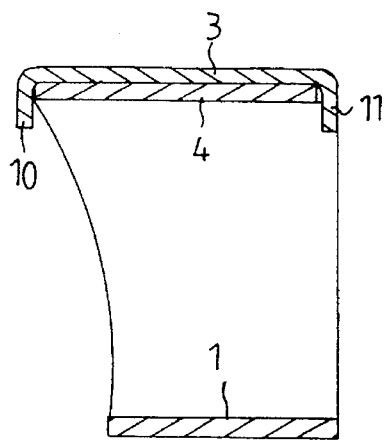
FIG. 17 is a cut-away front view figure showing a joint pertaining to the fifth joining method of the present invention.
Figure 18A:
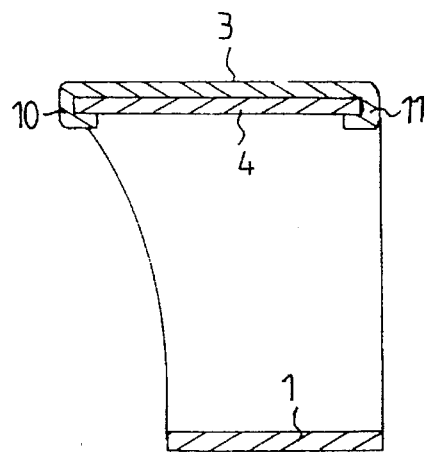
FIG. 18 is a cut-away front view/side view figure showing a completed joint pertaining to the fifth joining method of the present invention.
Figure 18B:
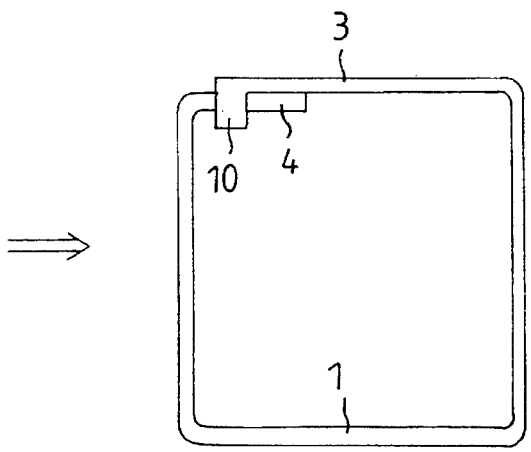

As shown in FIG. 1, the joining sleeve assembly of the present invention for joining a metal cookware with a cookware handle consists of a long metal piece 1. The front of the long metal piece 1 has an arc-shaped opening 2, and the two ends of the long metal piece 1 are configured as a longer end 3 and shorter end 4. The shorter end 4 is equipped with two ladder-shaped protruding pieces 5 and 7, formed by punching with a punching machine. The longer end 3 is equipped with a bending elevated flat surface 6, and the bending elevated flat surface 6 is equipped with two rectangular through holes 8 and 9 that correspond to the two ladder-shaped protruding pieces 5 and 7. The size of the rectangular through holes 8 and 9 is such that the two ladder-shaped protruding pieces 5 and 7 can fit into these two rectangular through holes 8 and 9. When the metal piece 1 is bent to form a hollow joining sleeve assembly, as shown in FIG. 2, the bending elevated flat surface 6 is caused to bend downward, so that the shorter end 4 can be folded thereto, thereby allowing the two ladder-shaped protruding pieces 5 and 7 on the shorter end 4 to fit into the two corresponding rectangular through holes 8 and 9 already installed on the bending elevated flat surface 6. Then, a press is used to cause the two ladder-shaped protruding pieces 5 and 7 and the two rectangular through holes 8 and 9 to bond to each other, so that the portions of the two ladder-shaped pieces 5 and 7 protruding from the two rectangular through holes 8 and 9 are squeezed back into the two rectangular through holes 8 and 9, thereby causing the two ends to join together tightly and completing the joint-forming operation, as shown in FIG. 3. FIG. 4 shows a second joining method. According to this second method, the joining sleeve assembly of the present invention for joining a metal cookware with a cookware handle consists of a long metal piece 1. The two sides of the shorter end 4 are each equipped with a protruding piece 10 or 11, and the two outer sides of the bending point of the bending flat surface 6 of the longer end 3 are equipped with two rectangular holes 12 and 13 that correspond to the two protruding pieces 10 and 11, as shown in FIG. 6. When the metal piece 1 is bent to form a hollow joining sleeve assembly, the shorter end is folded onto the bending flat surface 6 and, at the same time, the two protruding pieces 10 and 11 are inserted into the two rectangular holes installed at the two outer sides of the bending point of the bending flat surface 6. The joint can be completed by means of hook-coupling linkage, which involves simply bending the two protruding pieces 10 and 11 backward and pressing the hooks thus formed tightly, as shown in FIG. 5. FIG. 7 shows a third joining method. According to this third method, the joining sleeve assembly of the present invention for joining a metal cookware with a cookware handle consists of a long metal piece 1. The shorter end 4 is equipped with a pair of partially severed round arc-shaped protruding pieces 14 and 15, and the bending elevated flat surface 6 is equipped with two corresponding rectangular through holes 8 and 9. The size of the rectangular through holes 8 and 9 is such that the two round arc-shaped protruding pieces 14 and 15 can fit into these two rectangular through holes 8 and 9. When the metal piece 1 is bent to form a hollow joining sleeve assembly, as shown in FIG. 8, the two round arc-shaped protruding pieces 14 and 15 on the shorter end 4 are caused to fit into the two rectangular through holes 8 and 9. The joint can be completed by means of either employing a hook-coupling linkage, which involves simply bending the two round arc-shaped protruding pieces 14 and 15 backward and pressing the hooks thus formed tightly, as shown in FIG. 9, or pressing directly the two round arc-shaped protruding pieces 14 and 15 and the bending elevated flat surface 6 to cause them to stack together, as shown in FIG. 10. FIG. 11 shows a fourth joining method pertaining to the present invention. According to this fourth method, the bending flat surface 6 of a metal piece 1 is equipped beforehand with two rectangular through holes 8 and 9. When the metal piece 1 is bent to form a hollow joining sleeve assembly, a punching press is used to punch out two round arc-shaped protruding pieces 16 and 17 from the shorter end 4 on top of the two rectangular through holes 8 and 9 on the bending flat surface 6, as shown in FIG. 12, and the two round arc-shaped protruding pieces 16 and 17 are bent backward to form a hook-coupling linkage, as shown in FIG. 13, or a punching press is used to punch out a longer protruding piece 18 and a shorter protruding piece 19 from the flat surface of the shorter end 4, as shown in FIG. 14, and the longer protruding piece 18 is bent backward to form a hook-coupling linkage with the flat surface 6, while the shorter protruding piece 19 is squeezed tightly into the rectangular through hole, as shown in FIG. 15. FIG. 16 shows a fifth joining method pertaining to the present invention. According to this fifth method, the two ends of the outer sides of the longer end 3 of a metal piece 1 are each equipped with lateral protruding pieces 10 or 11, and two cut-out lines 22 and 23 are installed between the two protruding pieces 10 and 11 and the longer end 3. Meanwhile, the outer sides of the shorter end 4 are equipped with two rectangular openings 20 and 21 positioned appropriately. When the metal piece 1 is bent to form a hollow joining sleeve assembly, as shown in FIG. 17, the two protruding pieces 10 and 11 are situated just above the two rectangular openings 20 and 21. The two protruding pieces 10 and 11 in the two rectangular openings 20 and 21 are then bent backward tightly against the shorter end 4, as shown in FIG. 18 to form a hook-coupling linkage, thereby completing the joint-forming operation.

I claims:

1. A joining sleeve assembly for joining a metal cookware with a cookware handle, characterized in that the joining sleeve assembly consists of a metal piece, in that the front of the long metal piece has an arc-shaped opening and the two ends of the metal piece are configured as a longer end and shorter end, in that the shorter end is equipped with two ladder-shaped protruding pieces, formed by punching with a punching machine, in that the longer end is equipped with a bending elevated flat surface and the bending elevated flat surface is equipped with two rectangular through holes that correspond to the two ladder-shaped protruding pieces, in that, when the metal piece is bent to form a hollow joining sleeve assembly, the shorter end is caused to be stacked onto the bending elevated flat surface, thereby allowing the two ladder-shaped protruding pieces to fit into the two corresponding rectangular through holes, and in that a press is then used to cause the portions of the two ladder-shaped protruding pieces protruding from the two rectangular through holes to be squeezed back into the two rectangular through holes, thereby causing the two ends to join together tightly.

2. A joining sleeve assembly for joining a metal cookware with a cookware handle according to claim 1, wherein the two outer sides of the shorter end of the metal piece are each equipped with a protruding piece, and the two outer sides of the bending point of the bending flat surface of the longer end are equipped with two rectangular holes that correspond to the two protruding pieces, so that, when the metal piece is bent to form a hollow joining sleeve assembly, the two protruding pieces are inserted into the two rectangular holes and a press is used to bend the two protruding pieces backward and press the hooks thus formed tightly, thereby causing the two ends to join together tightly.

3. A joining sleeve assembly for joining a metal cookware with a cookware handle according to claim 1, wherein the shorter end of the metal piece is equipped with a pair of partially severed round arc-shaped protruding pieces while the bending flat surface of the longer end is equipped with two corresponding rectangular through holes, and, when the metal piece is bent to form a hollow joining sleeve assembly, the two round arc-shaped protruding pieces are caused to fit into the two rectangular through holes and the joint can be completed by means of either a hook-coupling linkage, which involves simply bending the two round arc-shaped protruding pieces backward and pressing the hooks thus formed tightly, or directly pressing the portions of the two round arc-shaped pieces protruding from the two rectangular through holes and the bending elevated flat surface to cause them to stack together tightly.

4. A joining sleeve assembly for joining a metal cookware with a cookware handle according to claim 1, wherein the bending flat surface of the metal piece is equipped beforehand with two rectangular through holes and, when the metal piece is bent to form a hollow joining sleeve assembly, a punching press is used to punch out two round arc-shaped protruding pieces from the shorter end on top on of the two rectangular through holes on the bending flat surface, and the two round arc-shaped protruding pieces are bent backward tightly to form a hook-coupling linkage, or a punching press is used to punch out a longer protruding piece and a shorter protruding piece from the flat surface of the shorter end, and the longer protruding piece is bend backward tightly to form a hook-coupling linkage with the flat surface, while the shorter protruding piece is squeezed tightly into the rectangular through hole to cause the two ends to join together tightly.

5. A joining sleeve assembly for joining a metal cookware with a cookware handle according to claim 1, wherein the two ends of the outer sides of the longer end of the metal piece are each equipped with a lateral protruding piece, two cut-out lines are installed between the two protruding pieces and the longer end, and the outer sides of the shorter end are equipped with two rectangular openings positioned appropriately so that, when the metal piece is bent to form a hollow joining sleeve assembly, the two protruding pieces are located just above the two rectangular openings, and the two protruding pieces in the two rectangular openings are then bent backward tightly against the shorter end to form a hook-coupling linkage.

* * * * *